United States Patent
Thompson

(10) Patent No.: US 9,110,573 B2
(45) Date of Patent: Aug. 18, 2015

(54) PERSONALIZED VIEWPORTS FOR INTERACTIVE DIGITAL MAPS

(71) Applicant: GOOGLE INC., Mountain View, CA (US)

(72) Inventor: Madeleine Thompson, New York, NY (US)

(73) Assignee: GOOGLE INC., Mountain View, CA (US)

( * ) Notice: Subject to any disclaimer, the term of this patent is extended or adjusted under 35 U.S.C. 154(b) by 107 days.

(21) Appl. No.: 13/871,189

(22) Filed: Apr. 26, 2013

(65) Prior Publication Data

US 2015/0185990 A1     Jul. 2, 2015

(51) Int. Cl.
*G06F 3/0484* (2013.01)
*G01C 21/36* (2006.01)

(52) U.S. Cl.
CPC .......... *G06F 3/0484* (2013.01); *G01C 21/3617* (2013.01)

(58) Field of Classification Search
CPC ............. G01C 21/367; G01C 21/3617; G09G 2340/045; G09G 5/14; G06F 2203/04806
USPC ........................................................ 345/660
See application file for complete search history.

(56) References Cited

U.S. PATENT DOCUMENTS

| | | | |
|---|---|---|---|
| 5,790,121 A * | 8/1998 | Sklar et al. | 715/853 |
| 6,424,355 B2 * | 7/2002 | Watanabe et al. | 345/668 |
| 6,642,936 B1 * | 11/2003 | Engholm et al. | 345/661 |
| 7,995,079 B2 | 8/2011 | Bells et al. | |
| 8,261,206 B2 | 9/2012 | Bennett et al. | |
| 8,296,061 B2 * | 10/2012 | Nesbitt | 701/426 |
| 8,315,791 B2 | 11/2012 | Bales et al. | |
| 8,326,524 B2 * | 12/2012 | Harada | 701/409 |
| 8,335,862 B2 | 12/2012 | Fletcher et al. | |
| 2005/0027705 A1 * | 2/2005 | Sadri et al. | 707/5 |
| 2009/0160873 A1 * | 6/2009 | Kew et al. | 345/629 |
| 2011/0191014 A1 | 8/2011 | Feng et al. | |
| 2012/0316782 A1 | 12/2012 | Sartipi et al. | |
| 2013/0038635 A1 | 2/2013 | Bales et al. | |

OTHER PUBLICATIONS

Google, "Google Earth User Guide," Jun. 1, 2010, Available http://web.archive.org/web/20100601204618/http://static.googleusercontent.com/external_content/untrusted_dlcp/earth.google.com/en/us/userguide/v4/google_earth_user_guide.pdf.*
"Now We'll Remember Your View: Map, Satellite, and Zoom," (2012). Retrieved from the Internet on Mar. 14, 2013: URL:http://mapping.topo.ly/2011/09/now-well-remember-your-view-map-satellite-zoom/.
"Southern Software MDS Features," (2013). Retrieved from the Internet on Mar. 14, 2013: URL:http://www.southernsoftware.net/Maps.htm.

(Continued)

*Primary Examiner* — Alvin Tan
(74) *Attorney, Agent, or Firm* — Marshall, Gerstein & Borun LLP

(57) ABSTRACT

A digital map of a geographic area is displayed in a current viewport. Viewport parameters that specify geographic locations and zoom levels for several viewports are received, and respective viewport indicators for these viewports are displayed. Each viewport indicator is centered on the digital map at the geographic center of the corresponding viewport. In response to one of the viewport indicators being selected via the user interface, the digital map is automatically displayed in the viewport corresponding to the geographic center and the zoom level of the selected viewport indicator.

16 Claims, 5 Drawing Sheets

(56) References Cited

OTHER PUBLICATIONS

"Using Spatial Bookmarks," (2012). Retrieved from the Internet on Mar. 14, 2013: URL:http://resources/arcgis.com/en/help/main/10.1/index.html.

Google, "Google Earth User Guide," (2010). URL:http://web.archive.org/web/20100601204618/http://static.googleusercontent.com/external_content/untrusted_dicp/earth.google.com/en/us/userguide/v4/google_earth_user_guide.pdf.

Trimble, "FastMap™ Mobile Software: User Guide," (2012).

\* cited by examiner

PERSONALIZED VIEWPORTS FOR INTERACTIVE DIGITAL MAPS

FIELD OF TECHNOLOGY

The present disclosure relates generally to interactive digital maps and, more particularly, to viewports for the display of interactive digital maps.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, a wide variety of electronic devices, such as mobile phones, desktop and portable computers, car navigation systems, hand-held Global Positioning System (GPS) units, etc. support software applications that display interactive digital maps. Depending on the software application and/or user preferences, digital maps may display topographical data, street and road data, urban transit information, traffic data, weather data, etc. Some software applications also receive geographic queries from users, such as requests to search for coffee shops in a certain area, and display search results on the digital map.

In general, users operate various user interface controls (radio buttons, scrollbars, etc.) or apply hand gestures (pinch, swipe, tap, etc.) to a touchscreen surface to pan the virtual camera to a new location and change the zoom level so as to set up a new viewport, or a portion of the digital map currently visible on the screen. In some cases, the user specifies a geographic location (e.g., "123 Main St."), and the software application centers the viewport around the specified location at a certain predefined zoom level. In any case, the user provides a significant amount of input to the software application to position the viewport as desired.

SUMMARY

A software application displays a digital map within a certain viewport and overlays the digital map with one or several viewport indicators, each corresponding to a respective personalized viewport. When the user clicks, taps on, or otherwise selects a viewport indicator, the software application directly switches to the viewport corresponding to the selected viewport indicator. In particular, the software application automatically changes the zoom level and/or pans the digital map to a new position. The viewport indicator can be, for example, a rectangle covering a region of the digital map approximately equal to the viewport corresponding to the viewport indicator.

More particularly, one embodiment of the techniques of the present disclosure is a computer-implemented method for efficiently changing viewports for viewing digital maps. The method includes displaying, via a user interface, a digital map in a current viewport. Further, the method includes receiving viewport parameters that specify geographic centers and zoom levels for several viewports and displaying respective viewport indicators for the several viewports, each centered on the digital map at the geographic center of the corresponding viewport. Still further, the method includes, in response to one of the viewport indicators being selected via the user interface, automatically displaying the digital map in the viewport corresponding to the geographic center and the zoom level of the selected viewport indicator.

In another embodiment, a method for personalizing interactive digital maps is implemented in a network device. The method includes determining viewport parameters for one or more viewports, including personalizing the one or more viewports based on past activity of a requestor. The requestor is the client device or a user of the client device. The viewport parameters indicate, for each of the one or more viewports, (i) a respective portion of the geographic area displayed within the viewport and (ii) a zoom level at which the portion of the geographic area is displayed. The method also includes providing the requested map data and the viewport parameters to the client device.

In yet another embodiment, a computer-readable medium stores instructions for efficiently changing viewports for viewing digital maps. When executed on one or more processors, the instructions cause the one or more processors to display, via a user interface, a digital map in a current viewport, overlay several selectable viewport indicators on the digital map, such that each of the plurality of selectable viewport indicators includes a shape covering a portion of the digital map at a respective location, and modify the current viewport in response to one of the plurality of selectable viewport indicators being selected, so that the portion of the digital map covered by the shape occupies substantially the entire viewport resulting from modifying the current viewport.

In still another embodiment, a device includes a means for displaying a digital map in a current viewport; a means for receiving viewport parameters that specify geographic locations and zoom levels for one or more viewports and displaying respective viewport indicators for the one or more viewports, each overlaying the digital map in accordance with the geographic location of the corresponding viewport; and a means for automatically displaying the digital map in the viewport corresponding to the geographic location and the zoom level of the selected viewport indicator, in response to one of the viewport indicators being selected via the user interface.

DETAILED DESCRIPTION

Generally speaking, software applications can implement the techniques of the present disclosure to allow users to efficiently select personalized viewports on interactive digital maps. A personalized viewport corresponds to a view of the digital map the user frequently selects explicitly (e.g., by panning and zooming), frequently selects implicitly (e.g., by searching for a street address), or defines manually (e.g., by drawing the boundaries of the viewport on the digital map). A network server or the client device can automatically develop a set of parameters of a personalized viewport based on the history of the user's previous interactions with the software application, provided the user consented to such application of the user's data. When the user clicks or taps on a view indicator, the software application automatically moves the current viewport to the new position and updates the zoom level, as necessary, to display the digital map within the personalized viewport corresponding to the selected viewport indicator.

As an initial matter, an example system in which these techniques can be implemented is discussed with reference to FIG. 1.

System Overview

Figure 1:
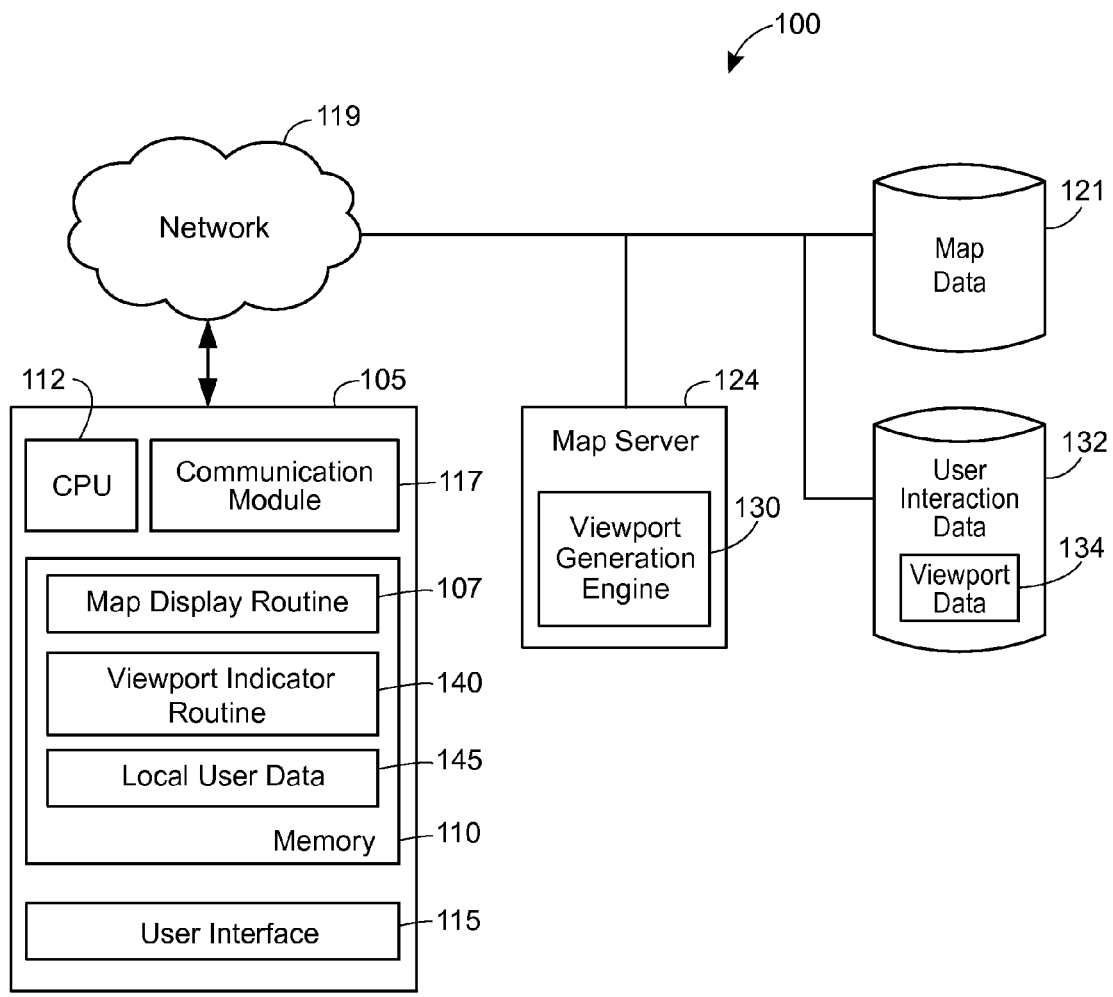
FIG. 1 illustrates an example computing system in which a computing device provides personalized viewports on an interactive digital map image.

An example computing system 100 of FIG. 1 includes a computing device 105, which provides selectable personalized viewports for interactive digital maps. The computing device 105 can be, for example, a desktop computer, a laptop computer, a tablet computer, a smartphone, etc. The computing device 105 includes a map display routine 107 stored in a memory 110 and executable by a central processing unit (CPU) 112. When executed by the CPU 112, the map display routine 107 displays interactive digital map images via user interface 115. The user interface 115 may include an input device such as a keyboard, a mouse, etc., an output device such as a monitor, or a combination input/output device such as a touchscreen. A communication module 117 includes a suitable wired or wireless interface to communicatively connect the computing device 105 to a communication network 119, which may be any suitable wired or wireless network.

In some implementations, the computing device 105 receives map data 121 (e.g. street data, traffic data, etc.) from a map server 124 in a vector graphics format, a raster format, or any other suitable format. The map data 121 may include data for generating two-dimensional (2D) maps or three-dimensional (3D) maps, depending on the scenario and/or implementation. The map server 124 may be associated with a service that provides interactive digital maps to client devices in response to queries, to which users may supply authentication data.

A viewport generation engine 130 operating in the map server 124 can develop parameters for personalized map viewports. The viewport parameters can include, for example, the geographic location and the zoom level of each personalized viewport. As discussed in more detail below, to develop these parameters for a certain user, the viewport generation engine 130 first checks whether the user has consented to the viewport generation engine 130 considering his previous interactions with the digital map, geographic searches, and other information that can be relevant in personalizing viewports. Upon verifying the user's consent, the viewport generation engine 130 can generate parameters for one or more personalized viewports based on the user interaction data 132.

The user interaction data 132 can include viewport data 134 that specifies the viewports previously selected by the user. The viewport data 134 also can include indications of how many times the user selected a particular viewport, how much time the user spent viewing the map using the viewport, how many searches the user performed within the viewport, etc. The viewport generation engine 130 stores personalized viewport data as part of the viewport data 134, according to an example implementation.

In operation, the map server 124 may send map data 121 along with map viewport parameters developed by the viewport generation engine 130 to the computing device 105. In turn, the computing device 105 may execute the map display routine 107 and a viewport indicator routine 140 to display an interactive digital map and overlaid viewport indicators, respectively. In some scenarios, the computing device 105 may analyze local user data 145 in memory 110 to modify the viewport parameters receive from the map server 124. For example, the local user data 145 may include device-specific display information (e.g. aspect ratios, screen resolution, etc.) that may be considered in displaying digital map images on the computing device 105.

In other implementations, the viewport generation engine 130 can operate in the client device 105 as a component of the map display routine 107, for example. Similarly, the viewport data 134, and even the map data 121, can be stored on the client device 105 rather than on a network device. However, it is noted that the map server 124 of FIG. 1 can provide personalized viewport data to a user regardless of which computing device the user is currently using.

Display and Use of Viewport Indicators

Figure 2:
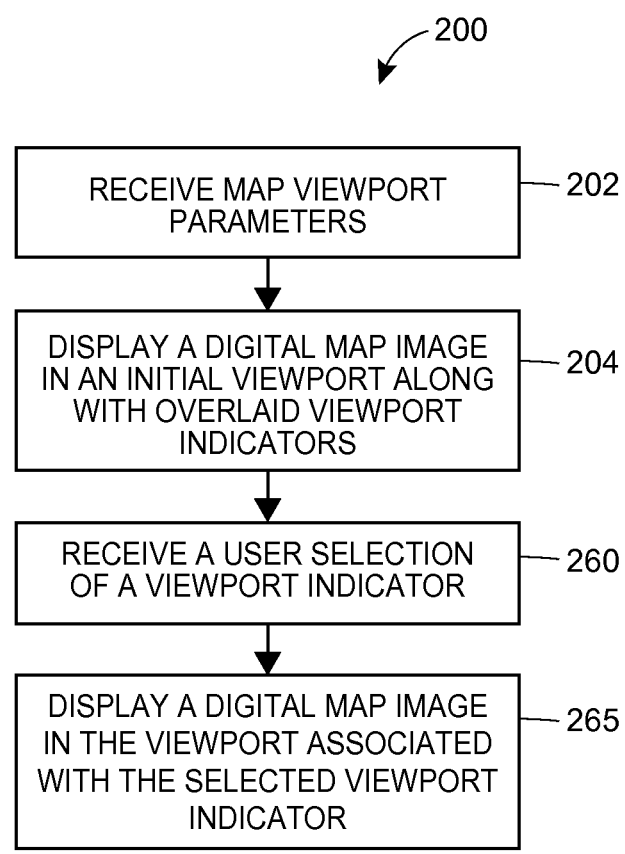
FIG. 2 is a flow diagram of an example method for providing personalized viewports, which can be implemented in the computing device of FIG. 1.

FIG. 2 is a flow diagram of an example method 200 for providing personalized viewports. The method 200 may be implemented in the computing device 105, for example, in the form of instructions stored in the memory 110 and executed by the CPU 112. In general, however, any suitable computing device may implement method 200.

At block 202, a set of map viewport parameters is received. For example, the map server 124 may develop and send the map viewport parameters to the computing device 105, as discussed further with reference to FIG. 5. The map viewport parameters associated with a specific viewport may indicate various properties such as the center of the geographic region visible in the viewport and the zoom level, for example. In general, the boundary of the viewport can be specified in any suitable manner. Further, in some implementation, viewport parameters can specify additional properties of the personalized viewport such as additional data layers (e.g., weather, traffic, satellite images). Still further, viewport parameters can indicate whether the digital map is to be displayed in the personalized viewport as a 2D map or a 3D map.

Figure 3:
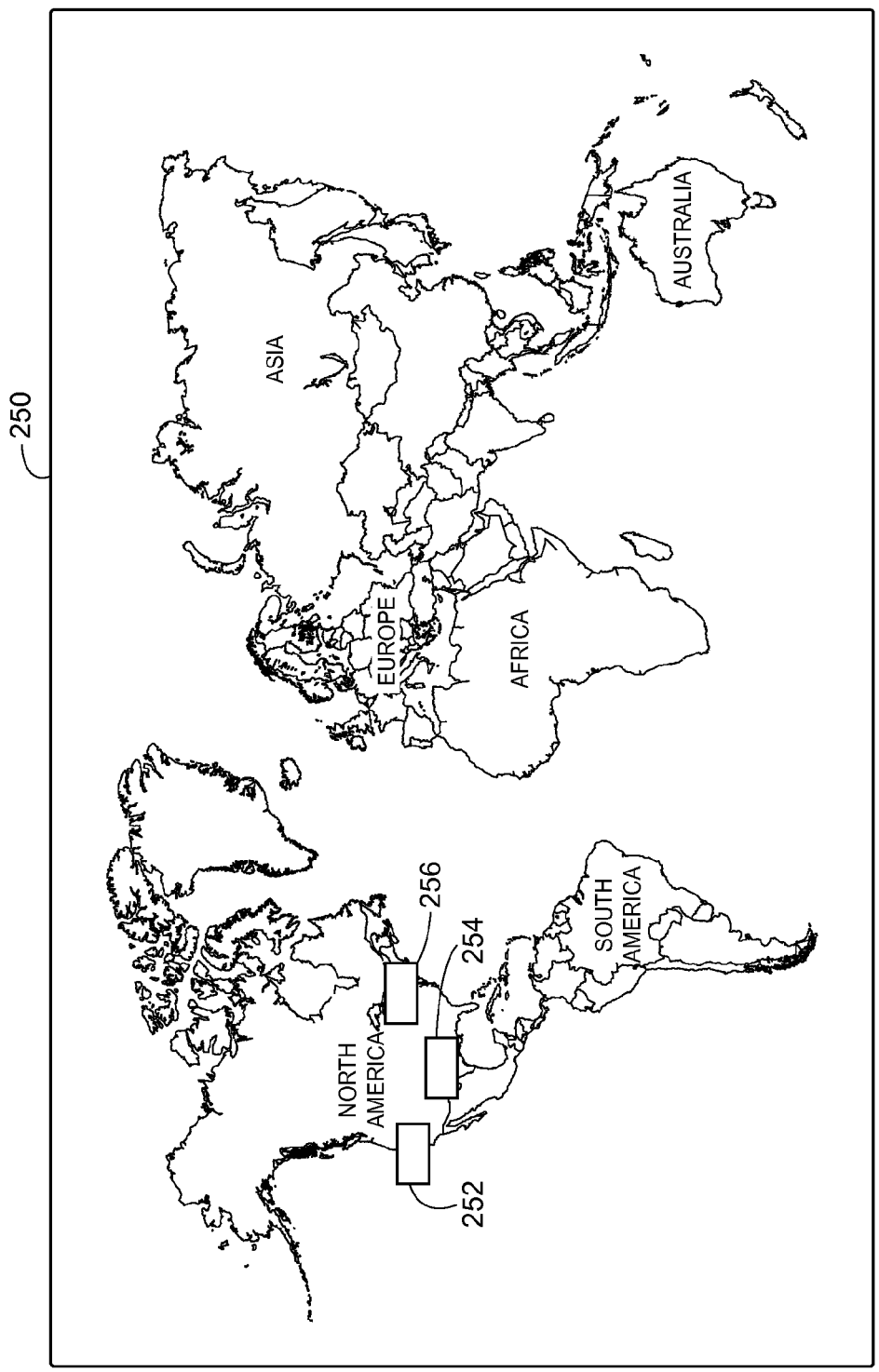
FIG. 3 illustrates an example digital map with overlaid viewport indicators using which personalized viewports can be selected on the computing device of FIG. 1.

At block 204, a digital map image is displayed in an initial viewport via a user interface (e.g., the user interface 115), along with viewport indicators that are overlaid on the digital map image. In FIG. 3, the viewport indicators are illustrated as rectangles representing bounding boxes of respective viewports, although other shapes, icons, or images can be used in other implementations. The shapes also can be highlighted, filled with a partially transparent color, etc. Viewport indicators can be positioned on the digital map in accordance with the geographic locations of the corresponding viewports.

For further clarify the operations at blocks 202 and 204, FIG. 3 illustrates an example digital map 250 which the computing device 105 may display within a current rectangular viewport via the user interface 115, for example. Depending on the implementation, the current viewport can be set to a predefined default position (e.g., the world, centered at zero latitude and zero longitude), the current location of the user (e.g., New York, with the zoom level at which the entire city is visible), the location of a search result (e.g., a certain intersection in Manhattan, with the zoom level at which several city blocks are visible, in response to the query "coffee shops in Manhattan"), etc. The current viewport also can be selected by panning and changing the zoom level.

Viewport indicators 252, 254, and 256 overlay the digital map 250 at locations corresponding to the respective personalized viewports. The viewport indicators in this example are shaped as rectangles having the same proportions as the current viewport in which the digital map 250 is displayed, with no fill color. In other words, these rectangles and the rectangle of the current viewport are geometrically similar. The size of each of the viewport indicators 252, 254, and 256 can correspond to the size of the corresponding personalized viewport. For example, the viewport indicator 256 is positioned over the northeastern part of the United States. When the user selects the viewport indicator 256, the portion of the digital map 250 currently enclosed by the rectangular boundary of the viewport indicator 256 will expand and occupy the entire viewport currently occupied by the digital map 250.

In other implementations, however, the size of a viewport indicator may correspond to a certain percentage of the digital map image based on aesthetics and/or practicality, and may not align with the boundary of the corresponding viewport. For example, viewport indicators making up 5% of the digital map image may be optimal for user selectivity and visibility (in other words, smaller indicators would be difficult to select, and larger indicators would be an annoyance). In general, viewport indicators overlaying a digital map in a current view need not be of the same size (or correspond to viewports of the same size).

Returning to FIG. 2, a selection of one of the viewport indicators displayed at block 204 is received at block 260. In an example implementation, the selection of a viewport indicator only requires a single operation on the part of the user. As a more specific example, the user may select a viewport via a single click, a tap or a double-tap gesture, a verbal command, etc.

Next, a digital map can be displayed in a personalized viewport corresponding to the selected viewport indicator (block 265). In some cases, to display the digital map in the newly selected personalized viewport, the software application adjusts the zoom level, changes the position of the virtual camera, etc. In any case, the user can quickly and efficiently switch the display a digital map to her preferred viewport, or one of her preferred viewports, with a single operation.

Figure 4:
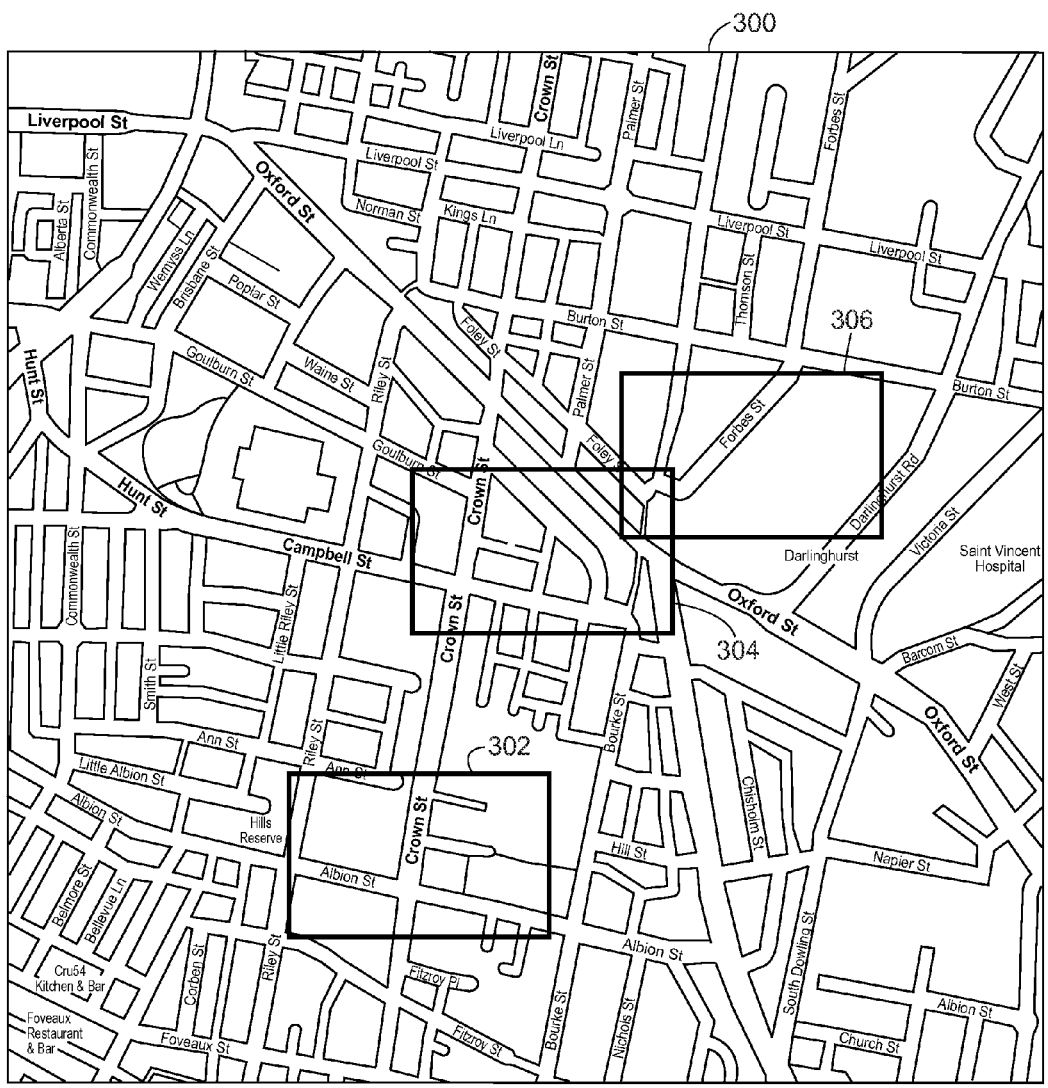
FIG. 4 illustrates another example digital map with overlaid viewport indicators.

In some embodiments, some of the viewport indicators become visible only at certain zoom levels. For example, viewport indicators corresponding to personalized viewports for viewing portions of a city may be displayed only when the city occupies a substantial part of the current viewport. FIG. 4 illustrates an example digital map image 300 of a city with overlaid viewport indicators 302, 304, and 306. The viewport indicators 302, 304, and 306 may not be displayed on a digital map depicting the entire country or the world, such as the digital map 250 of FIG. 3.

Personalized viewports also can be "nested." In particular, a set of initial viewport indicators can be provided on a digital map in an initial viewport and at an initial zoom level, and, upon selection of one of the provided viewport indicators, a set of new viewport indicators can be displayed on the digital map within the selected personalized viewport. In an example scenario, the computing device 105 may initially display a digital map of the United States with overlaid viewport indicators corresponding to viewports for viewing certain states. Next, upon selection of a viewport indicator overlaid on the state of Illinois, the computing device may zoom/pan to a display of a digital map image of Illinois state with new viewport indicators overlaid on certain cities in Illinois. Further, upon selection of a viewport indicator overlaid on the city of Chicago, the computing device may zoom/pan to the display a digital map image of the city of Chicago with new viewport indicators overlaid on certain neighborhoods in the city of Chicago.

Generation of Viewport Parameters

Figure 5:
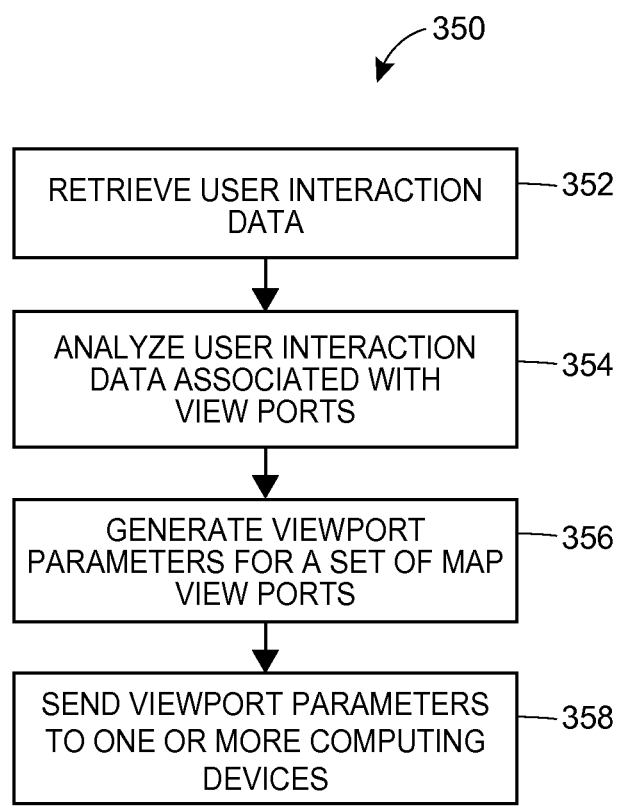
FIG. 5 is a flow diagram of an example method for generating parameters of personalized viewports, which can be implemented in the system of FIG. 1.

FIG. 5 is a flow diagram of an example method 350 for generating viewport parameters for a set of map viewports. The method 350 may be implemented in map server 124, for example. Elements of FIG. 1 will be referenced below for ease of discussion. However, it is understood that any suitable server, or other computing device, may implement the method 350. For example, a computing device that implements the method 200 also may implement the method 350.

At block 352, user interaction data for a certain user is retrieved for generating personalized viewport data, if the user has consented to such use by operating appropriate controls, for example. As discussed above, the user interaction data can be retrieved from the user interaction database 132, for example. The user interaction data may include user preferences, settings, saved or "starred" locations, location history, indications of prior geographic searches, etc. Further, the user interaction data may include data specifically related to map viewports, such as indications of frequently utilized viewports and user preferences related to displayed viewport elements (traffic, satellite images, etc.), etc.

A block 354, the user interaction data related to map viewports is analyzed. For example, the viewport generation engine 130 may determine that the user frequently views certain geographic locations or areas, uses certain zoom levels, etc. Based on an analysis of this data, the viewport indicator routine 135 may identify personalized viewports that are likely to be of interest to the user, for display on digital maps. As a more specific example, an analysis of the user interaction data at block 354 may reveal that the user resides in Chicago and also frequently pulls up a map of Champaign, Ill. at a certain zoom level. Accordingly, respective viewports in which Chicago and Champaign are visible are likely to be relevant to the user.

Further, in some implementations, the analysis of user interaction data at block 354 may reveal stylistic or supplementary elements of an interactive digital map viewport likely to be of interest to a user. For example, a viewport may not only facilitate the display of a digital map of downtown Chicago at a certain zoom level, but the viewport may also indicate that current traffic conditions should be displayed on major highways of the digital map image (e.g. with highlighted colors). In another example, a viewport may allow the display of the Manhattan borough of New York City on a digital map image along with urban transit information (e.g. subway stops, bus routes, etc.).

Next, at block 356, parameters for a set of map viewports are developed based on the analysis of the user interaction data. For example, the zoom level and the geographic center can be identified for each personalized viewport. In some cases, the parameters for a set of map viewports also indicate appropriate viewports in which viewport indicators are displayed. For example, viewport parameters for a map viewport of the country of Australia may indicate that a viewport indicator representing the map viewport should only be displayed on digital maps of the entire globe or digital maps of the Pacific ocean region.

According to some implementations, viewport parameters are developed based on user-defined preferences. For example, a user of computing device 105 may specify, via user interface 115, certain preferred viewports by drawing a shape on the digital map, for example, and the viewport generation engine 130 may develop parameters for a preferred viewport based on the drawn shape. The user also may select layers of map data to be included in the viewport, such as traffic or weather.

The analysis of the user interaction data includes an approximation of viewport parameters based on the user interaction data, in some scenarios. The user interaction data may indicate similar but not exactly overlapping viewports, where the similar viewports have small variations in zoom levels, reference points, camera views, etc., for example. In such a scenario, viewport parameters may be approximated by an average of viewport parameters (e.g. an average of the centroids of frequently utilized viewports) in the user interaction data or other suitable analysis of the user interaction data.

At block 358, the parameters corresponding to one or more map viewports are sent to the user's computing device. For example, the computing device 105 may request map data 121 from the map server 124, and, subsequently, the map server 124 may send the generated viewport parameters along with portions of map data to the computing device 105. In some cases, the map server 124 may periodically (e.g. once a hour, day, week, month, etc.) download viewport parameters to the computing device 105.

In some scenarios, viewport parameters are stored on remote computer-readable media and retrieved by a computing device as needed. For example, a user of a computing device may log in to a mapping application on a mobile computing device, such as a smartphone or tablet computer, and, upon logging in, retrieve map viewport parameters associated with a user account. At another time, the user may log in to the mapping application on a desktop computer, for example, and retrieve map viewport parameters associated with the same user account. In this way, viewport parameters are consistent across multiple different computing devices, in an embodiment.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for providing personalized viewports through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method for efficiently changing viewports for viewing digital maps, the method comprising:
    displaying, for a certain user via a user interface, a digital map in a current viewport;
    receiving viewport parameters that indicate geographic centers and zoom levels for a plurality of viewports, wherein each of the plurality of viewports is personalized independently of every other one of the plurality of viewports and determined based on at least one of: (i) how much time the user spent viewing the digital map within the viewport, (ii) how many times the user selected the viewport, or (iii) how many searches the user performed within the viewport;
    displaying respective viewport indicators for the plurality of viewports, including centering each viewport indicator on the digital map at the geographic center of the corresponding viewport; and
    in response to one of the viewport indicators being selected via the user interface, automatically displaying the digital map in the viewport corresponding to the geographic center and the zoom level of the selected viewport indicator.

2. The method of claim 1, wherein each viewport indicator is shaped as the current viewport and scaled so as to cover a portion of the digital map covered by the viewport corresponding to the viewport indicator.

3. The method of claim 2, wherein each viewport indicator has a substantially rectangular shape.

4. The method of claim 1, wherein the plurality of viewports is a first plurality of viewports, and wherein the viewport data further specifies geographic centers and zoom levels for a second plurality of viewports; the method further comprising:

when the digital map is displayed in the viewport corresponding to the geographic center and the zoom level of the selected viewport indicator, displaying respective viewport indicators for the second plurality of viewports on the digital map.

5. The method of claim 1, further comprising detecting the selection of the one or more viewport indicators via a single user operation.

6. The method of claim 5, wherein:
the user interface includes a touchscreen, and
the user operation is one of (i) a tap or (ii) a double tap.

7. The method of claim 5, wherein:
the user interface includes a mouse, and
the user operation is one of (i) a click or (ii) a double click.

8. A method in a network device for personalizing interactive digital maps, the method comprising:
receiving, from a client device, a request for map data for a specified geographic area;
determining viewport parameters for a plurality of viewports based on a plurality of past activities corresponding to a user, wherein determining the viewport parameters includes personalizing each of the plurality of viewports independently of every other one of the plurality of viewports and based on at least one of: (i) how much time the user spent viewing the digital map within the viewport, (ii) how many times the user selected the viewport, or (iii) how many searches the user performed within the viewport, and wherein:
the viewport parameters indicate, for each of the plurality of viewports, (i) a respective portion of the geographic area displayed within the viewport and (ii) a zoom level at which the portion of the geographic area is displayed; and the method further comprising:
providing the requested map data and the viewport parameters to the client device.

9. The method of claim 8, wherein personalizing each of the plurality of viewports independently of every other one of the plurality of viewports includes personalizing each of the plurality of viewports further in view of preferences corresponding to the user.

10. The method of claim 8, wherein indications of one or more of (i) how much time the user spent viewing the digital map within the viewport, (ii) how many times the user selected the viewport, or (iii) how many searches the user performed within the viewport were received from a plurality of devices operated by the user.

11. The method of claim 8, wherein the viewport parameters specify, for each viewport, a boundary of the portion of the geographic area.

12. The method of claim 8, wherein the viewport parameters specify a geographic center of the portion of the geographic area.

13. A non-transitory computer-readable medium storing thereon instructions for efficiently changing viewports for viewing digital maps, wherein the instructions, when executed on one or more processors, cause the one or more processors to:
display, for a certain user via a user interface, a digital map in a current viewport;
overlay a plurality of selectable viewport indicators on the digital map, wherein each of the plurality of selectable viewport indicators includes a shape covering a portion of the digital map at a respective location to define a respective viewport, and wherein each of the respective viewports is generated independently of every other viewport based on at least one of: (i) how much time the user spent viewing the digital map within the corresponding viewport, (ii) how many times the user selected the corresponding viewport, or (iii) how many searches the user performed within the corresponding viewport; and
modify the current viewport in response to one of the plurality of selectable viewport indicators being selected, whereby the portion of the digital map covered by the shape occupies substantially the entire modified viewport.

14. The computer-readable medium of claim 13, wherein the shape of selectable viewport indicators is geometrically similar to the shape of the current viewport.

15. The computer-readable medium of claim 13, wherein the digital map is displayed in response to a request from the user.

16. The computer-readable medium of claim 13, wherein to modify the current viewport, the instructions cause the one or more processors to zoom in on the location at which the viewport indicator is disposed.

* * * * *